(12) United States Patent
Tariq

(10) Patent No.: US 6,865,520 B2
(45) Date of Patent: Mar. 8, 2005

(54) SYSTEM AND METHOD FOR FILTERING OUTPUT IN MASS FLOW CONTROLLERS AND MASS FLOW METERS

(75) Inventor: Faisal Tariq, Allen, TX (US)

(73) Assignee: Mykrolis Corporation, Billerica, MA (US)

( * ) Notice: Subject to any disclaimer, the term of this patent is extended or adjusted under 35 U.S.C. 154(b) by 88 days.

(21) Appl. No.: 10/133,110

(22) Filed: Apr. 26, 2002

(65) Prior Publication Data

US 2002/0161559 A1 Oct. 31, 2002

Related U.S. Application Data

(60) Provisional application No. 60/286,934, filed on Apr. 27, 2001.

(51) Int. Cl.[7] .............................................. G06F 15/00
(52) U.S. Cl. ..................................... 702/190; 702/189
(58) Field of Search ................................ 702/189, 190, 702/193, 194, 195, 23, 24, 31, 57; 73/861.01, 861; 438/935; 700/212, 282, 283, 284, 285

(56) References Cited

U.S. PATENT DOCUMENTS

| | | | | |
|---|---|---|---|---|
| 5,220,515 A | * | 6/1993 | Freerks et al. ................. | 702/47 |
| 5,555,190 A | * | 9/1996 | Derby et al. .................. | 702/45 |
| 5,730,181 A | * | 3/1998 | Doyle et al. ............. | 137/487.5 |
| 5,741,980 A | * | 4/1998 | Hill et al. ................. | 73/861.04 |
| 6,389,364 B1 | * | 5/2002 | Vyers .......................... | 702/45 |
| 6,607,597 B2 | * | 8/2003 | Sun et al. .................... | 118/309 |
| 2002/0117212 A1 | * | 8/2002 | Vyers et al. ............. | 137/487.5 |
| 2002/0153100 A1 | * | 10/2002 | Hsiao .................... | 156/345.27 |

OTHER PUBLICATIONS

Henning, A;"Microfludic Mems for Semiconductor Processing", 2nd Annual IEEE International Conference Proceedings On Innovative Systems In Silicon; Oct. 8–10, 1997; pp 340–349.*

Henning, A;"Microfludic Mems"; Aerospace Conference Proceedings; IEEE vol. 1; Mar. 21–28, 1998; pp 471–486.*

International Search Report mailed Sep. 30, 2002 for International Application No. PCT/US02/13207.

* cited by examiner

Primary Examiner—John Barlow
Assistant Examiner—Douglas N Washburn
(74) Attorney, Agent, or Firm—Sprinkle IP Law Group

(57) ABSTRACT

Embodiments of the present invention provide a method for filtering an indicated flow. One embodiment of the present invention can include the steps of (i) determining if the indicated flow is within an allowable deviation of a baseline, (ii) if the indicated flow is within the allowable deviation, outputting the indicated flow as the filtered indicated flow, and (iii) if the indicated flow is not within the allowable deviation, outputting a value that is within the predefined range as the filtered indicated flow. This embodiment of the present invention can also include determining if the indicated flow exceeds a buffer. If the indicated flow does not exceed the buffer, one embodiment of the present invention can continue to output the value that is within the allowable deviation.

17 Claims, 4 Drawing Sheets

SYSTEM AND METHOD FOR FILTERING OUTPUT IN MASS FLOW CONTROLLERS AND MASS FLOW METERS

RELATED INFORMATION

The present invention claims priority under a 35 USC 119(e) to provisional patent application No. 60/286,934, entitled "MFC & MFM Output Filter," by Faisal Tariq filed Apr. 27, 2001, which is hereby fully incorporated by reference.

TECHNICAL FIELD OF THE INVENTION

The present invention relates generally to mass flow controllers and mass flow meters and more particularly to a output filter for mass flow controllers and mass flow meters.

BACKGROUND OF THE INVENTION

As the silicon wafers used by semiconductor manufacturers increase in size, more accurate control of gas flow through the manufacturing equipment has become more critical for the precise fabrication of circuits on the wafers. Mass flow controllers and mass flow meters are typically used to control and monitor gas flow through a semiconductor manufacturing tool. In the manufacturing process, if the controller or monitor detects a fluctuation in gas pressure that is outside predefined operating parameters for a particular manufacturing tool, an alarm is usually triggered to shut down the tool. This is often costly to manufacturers as it reduces throughput and because the wafer batch being processed when the tool is shut down is usually ruined. Even if the batch is not ruined or damaged, however, additional wafer batches cannot be processed until the tool is brought back online. This is even more annoying and inefficient when the shutdown of the manufacturing tool is due to a false alarm (i.e. a non-critical event).

In this regard, conventional mass flow controllers and mass flow meters are deficient because they often produce false alarms due to noise or transient pressure spikes that do impact the manufacturing process by exceeding the manufacturing tolerances. In a mass flow controller, for example, a thermal flow sensor reads the flow of gas to a manufacturing tool. The conventional thermal flow sensor, however, has several limitations, one of these being that the time constant used by the thermal flow sensor to read gas flow through the system is much longer than the desired time necessary to control the flow. In other words, by the time the thermal flow sensor reads an event it is too late to react to the event by controlling the gas flow or shutting down the system. One method of accelerating or predicting gas flow faster than provided by the conventional thermal flow sensor is to derive a weighted first derivative of the signal generated by the thermal flow sensor and add the weighted derivative to the signal, producing an indicated flow. The indicated flow is then compared to a set point for the manufacturing tool. If there is an error (e.g., if the indicated flow does not match the set point) a gas flow valve will typically be throttled so that the indicated flow matches the set point, yielding zero error, or if the error is greater than a predetermined level, the tool is shut down.

FIG. 1 is a diagrammatic representation illustrating a prior art system 100 for regulating gas flow. In system 100, the actual gas flow 105 is monitored by thermal flow sensor 110. Thermal flow sensor 110 samples the actual flow 105 and outputs signal 115 representing the actual gas flow 105. To accelerate or predict the flow faster, a derivative controller 120 ("D-controller" 120), derives a weighted first derivative of signal 117 by multiplying a predetermined gain times the first derivative of signal 115 to produce derivative signal 117. Derivative signal 117 is then added to signal 115 via summer 119 to produce indicated flow 125.

Indicated flow 125 can be compared to a set point for the manufacturing tool involved (e.g., at a comparator 127). If the indicated flow does not match the set point (e.g., if an error is detected) a gas flow valve current or actuator current (signal 137) is generated to throttle valve 130, thereby regulating the actual flow 105 and yielding a zero error. The throttling of valve 130 is achieved via a proportional and integral controller 135 ("P&I controller" 135). Thus, while thermal flow sensor 110 operates on a time scale longer than desired for the control of actual flow 105, the output of thermal flow sensor 115 is manipulated to achieve faster response, thus providing a means to control the gas flow, if a critical event is encountered, in a timely manner avoiding damage to the current work product.

While an improvement in monitoring and controlling of gas flows, these prior art systems still have several shortcomings. Thermal flow sensor 110 is located at only one location in actual flow path 105 and can only detect local flow. Thus, thermal flow sensor 110 may detect local instabilities in actual flow 105 that are not representative of the flow as a whole. For example, if thermal flow sensor 110 is located at an area of local turbulence (e.g., near a bend in the gas flow path), it may pick up local instabilities that are not representative of what is actually occurring downstream at the fabrication chamber. Furthermore, the sensor may itself cause eddy currents at its mouth, thereby causing thermal flow sensor 110 to produce an inaccurate or noisy signal 115. The prior art system is further deficient in that derivative signal 117 typically enhances any noise present in signal 115. Thus, indicated flow 125 includes enhanced noise that is often not representative of actual flow 105.

When indicated flow 125 is compared to the set point for a tool (typically after indicated flow 125 reaches steady state), if the mismatch between indicated flow 125 and the set point is greater than the threshold valve, an alarm is generated triggering a shut down of the tool, typically ruining the batch of wafers upon which work is currently being performed. This mismatch often is not due to levels of noise in actual flow 105, but may be caused by the enhanced noise present in derivative signal 117. To compensate for noise in indicated flow 125, P&I controller 135 includes filtering capabilities. However, the filtering capabilities of conventional mass flow meters are limited because they can not adequately filter noise that spans over a broad frequency range.

Furthermore, these prior art systems are limited because they generally do not handle pressure spikes well. If there is a brief pressure spike in actual flow 105, the spike, which would be represented in indicated flow 125, can cause an alarm condition (e.g., can cause the tool to shut down) even if the spike would not affect the production process by exceeding its tolerances. Thus, the prior art systems cause unnecessary downtime due to noise or transient pressure differences.

Therefore, a need exists for a filter that is independent of the noise frequency, is less affected by transient spikes and does not compromise the response time of the tool to which it is being applied.

SUMMARY OF THE INVENTION

The present invention has been made in view of the above circumstances and can be characterized by one aspect as an output filter that substantially eliminates or reduces disadvantages and problems associated with conventional filters. More particularly, embodiments of the present invention provide a method for filtering an indicated flow. Additional aspects and advantages of the invention will be set forth in part in the description which follows, and in part will be obvious from the description, or may be learned by practice of the invention. The aspects and advantages of the invention will be realized and attained by means of the elements and combinations particularly pointed out in the appended claims.

To achieve these and other advantages and in accordance with the purpose of the present invention, as embodied and broadly described, the present invention can be characterized according to one aspect of the invention as comprising the steps of (i) determining if the indicated flow is within an allowable deviation from a baseline, (ii) if the indicated flow is within the allowable deviation, outputting the indicated flow as the filtered indicated flow, and (iii) if the indicated flow is not within the allowable deviation, outputting a value that is within allowable deviation as the filtered indicated flow. For example, the output filter can output the last sample of the indicator flow that was within the allowable deviation. Embodiments of the present invention can also include determining if the indicated flow has exceeded a buffer. If the indicated flow has not exceeded the buffer, one embodiment of the present invention can continue to output the value that is within the allowable deviation. If, however, the indicated flow has exceeded the buffer, the output filter can engage a timer having a clock limit. If the indicated flow does not return to within the allowable deviation before the timer reaches a clock limit, the embodiment of the present invention can output the indicated flow, which remains outside of the buffer, as the filtered indicated flow.

Another aspect of the present invention can be characterized as including the steps of (i) filtering the indicated flow to derive an intermediate filtered indicated flow, (ii) deriving a weighted first derivative of the intermediate filtered indicated flow, and (iii) outputting a filtered indicated flow comprising the sum of the intermediate filtered indicated flow and the weighted first derivative of the intermediate filtered indicated flow.

Embodiments of the present invention provide an important technical advantage with respect to previous filtering techniques by eliminating noise across a range of frequencies while outputting persistent changes in an indicated flow.

Embodiments of the present invention provide another important technical advantage by removing transient spikes from a filtered indicated flow.

Embodiments of the present invention provide yet another important technical advantage by significantly reducing the likelihood that a false alarm condition will occur due to noise or transient spikes in an indicated flow.

Embodiments of the present invention provide yet another important technical advantage by eliminating noise and transient spikes from an indicated flow without reducing the response time of the system to which the present invention is being applied.

It is to be understood that both the foregoing general description and the following detailed description are explanatory only and are not restrictive of the invention as claimed.

BRIEF DESCRIPTION OF THE DRAWINGS

The accompanying drawings which are incorporated in and constitute a part of this specification, illustrate several embodiments of the invention and together with the description, serve to explain the principles of the invention.

DETAILED DESCRIPTION OF THE INVENTION

Reference will now be made in detail to exemplary embodiments of the invention, examples of which are illustrated in the accompanying drawings. Wherever possible, the same reference numbers will be used throughout the drawings to refer to the same or like parts.

One embodiment of the present invention can include a mass flow controller capable of comparing an indicated flow to a baseline (e.g., a set point) and determining if the indicated flow is within an allowable deviation of the baseline. If the indicated flow is within the allowable deviation from the baseline, the mass flow controller can output the indicated flow as a filtered indicated flow. Otherwise, the mass flow controller can output an value within the allowable deviation from baseline as the filtered indicated flow.

Another embodiment of the present invention can include a mass flow meter capable of generating a filtered indicated flow by (i) filtering an indicated flow to derive an intermediate filtered indicated flow; (ii) deriving a weighted first derivative of the intermediate filtered indicated flow; and (iii) outputting a filtered indicated flow comprising the sum of the intermediate filtered indicated flow and the weighted first derivative of the intermediate filtered indicated flow.

Embodiments of the present invention provide an output filter capable of filtering noise in an indicated flow across a range of frequencies, and embodiments of the present invention provide the capability to filter transient spikes in an indicated flow. Thus, noise and pressure spikes present in the indicated flow can be filtered so that they do not generate false alarms and/or unnecessary gas flow manipulations. For the purposes of this application, "indicated flow" will refer to representation of actual flow output by various flow measuring and/or regulating devices. The indicated flow is capable of including the direct output of a flow sensor or a manipulated output. For example, the indicated flow is capable of including the output of a thermal flow sensor summed with a weighted derivative of the thermal flow sensor's output. While the indicated flow typically includes the weighted first derivative of a flow sensor's output, it is also capable of including the second, third, etc. derivatives, or other mathematical manipulations in whole or in part. Furthermore, the indicated flow can include any representation of an actual flow that is used to monitor, regulate or control the actual flow.

Figure 1:
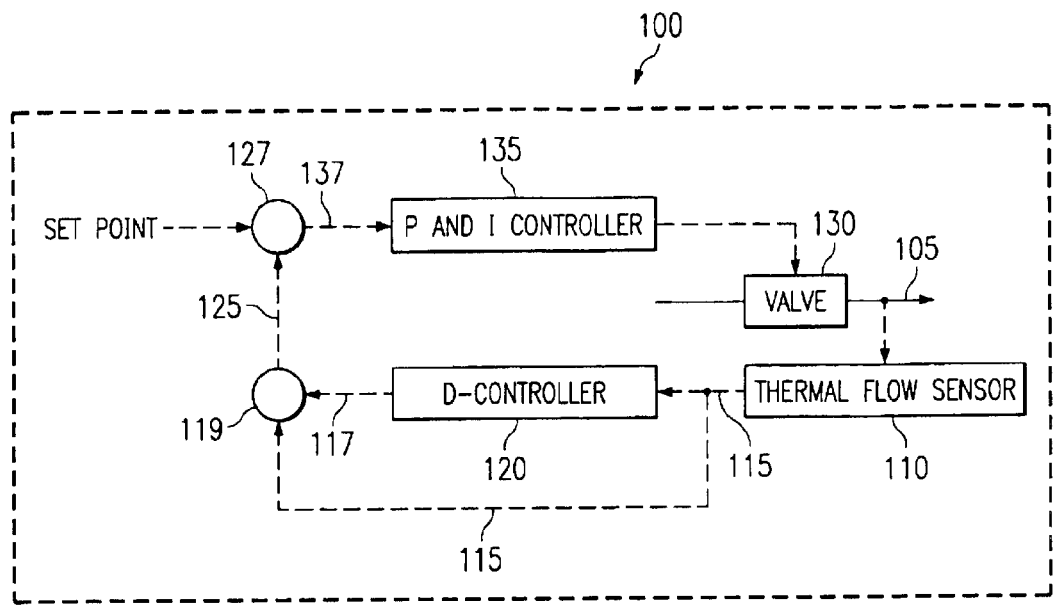
FIG. 1 is a diagrammatic representation illustrating a prior art system for regulating gas flow.
Figure 2:
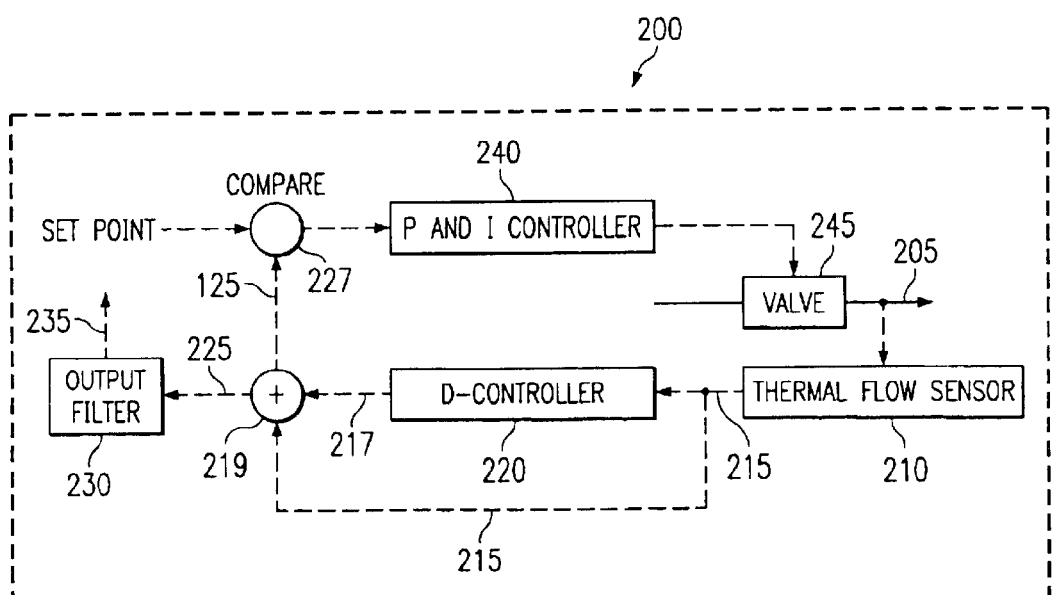
FIG. 2 is a schematic representation of one embodiment of a mass flow controller that can utilize embodiments of a output filter according to the present invention.

FIG. 2 is a schematic representation of one embodiment of a mass flow controller 200 that is capable of utilizing embodiments of a output filter according to the present invention. The mass flow controller includes digital and/or analog components and measures the actual flow 205 via a thermal flow sensor 210. Thermal flow sensor 210 outputs and electrical signal 215 representing actual flow 205. As would be understood by one of ordinary skill in the art, since the time constant used by thermal flow sensor 210 may be longer than the time scale desired for controlling actual flow 205, signal 215 is manipulated (e.g. via a Derivative Controller and Summer) to achieve a faster response time. Accordingly, D-controller 220 in one embodiment of mass flow controller 200, generates a first derivative mass flow signal and multiplies it by a gain to produce derivative signal 217. Summer 219 can add derivative signal 217, which can include enhanced noise introduced by D-controller 220, to signal 215 to produce indicated flow 225. It should be noted that, in one embodiment of the present invention, indicated flow 225 can be essentially the same as the indicated flow 125 produced by prior art mass flow controllers.

D-controller 220 can, as would be understood by one of ordinary skill in the art, enhance the response time of mass flow controller 220. However, this may be done at the expense of enhancing noise in the output of thermal flow sensor 210. Thus, derivative signal 217 and, hence, indicated flow 225 can each include noise that does not normally show up in actual flow 205 (i.e. can include the enhanced noise added by D-controller 220). Noise (due to pressure spikes and sudden flow changes) in a indicated flow 225 can cause a tool to generate false alarms, thereby causing unnecessary shut downs of production lines. Output filter 230, however, is capable of filtering indicated flow 225 to remove noise or spikes from indicated flow 225, thereby producing a filtered indicated flow 235 that generates fewer false alarms and shutdowns. It should be noted that for the purposes of this application the term "filtered indicated flow" means the output of output filter 230 whether or not the output has been manipulated by output filter 230.

In addition to being filtered by output filter 230, indicated flow 225 can be compared (at comparator 227) to a set point (e.g., such as a desired point for a manufacturing tool or piece of manufacturing equipment) to determine if the actual flow 205 should be adjusted (e.g., throttled or increased). As would be understood by those of ordinary skill in the art, one consideration in adjusting actual flow 205 are the tolerances required by the particular manufacturing process in which the present invention is implemented. If the actual flow 205 should be adjusted according to the comparison of indicated flow 225 to the set point, P&I controller 240 opens or closes gas flow valve 245 to throttle or increase actual flow 205. Additionally, the filtered indicated flow 235 can be compared to a set point for the manufacturing tool to determine if conditions deviate appreciably from the set point for a sufficient time period, warranting shutting down the tool. If, for example, the filtered indicated flow 235 falls outside of a specified operating range, an alarm signal, is generated to shut valve 245. However, because output filter 230 can remove noise and transient spikes from indicated flow 225, the manufacturing tool less likely to shut down due to these types of false alarm conditions.

It should be noted that, in the mass flow controller employing one embodiment of an output filter according to the present invention, the output filter is not in the feedback loop. It should be further noted that the configuration of mass flow controllers illustrated in FIG. 2 is exemplary only and other configurations of mass flow controllers can be employed and not deviate from the techniques of the present invention. One example of a mass flow controller which could include an embodiment of an output filter according to the present invention can be found in U.S. patent application Ser. No. 09/350,744, "System and Method of Operation of a Digital Mass Flow Controller," which is hereby fully incorporated by reference. Furthermore, embodiments of the present invention can be implemented in micro-processor based mass flow controllers and analog based mass flow controllers. The use of a digital signal processor ("DSP") platform, in particular, can make implementation more streamlined.

Figure 3:
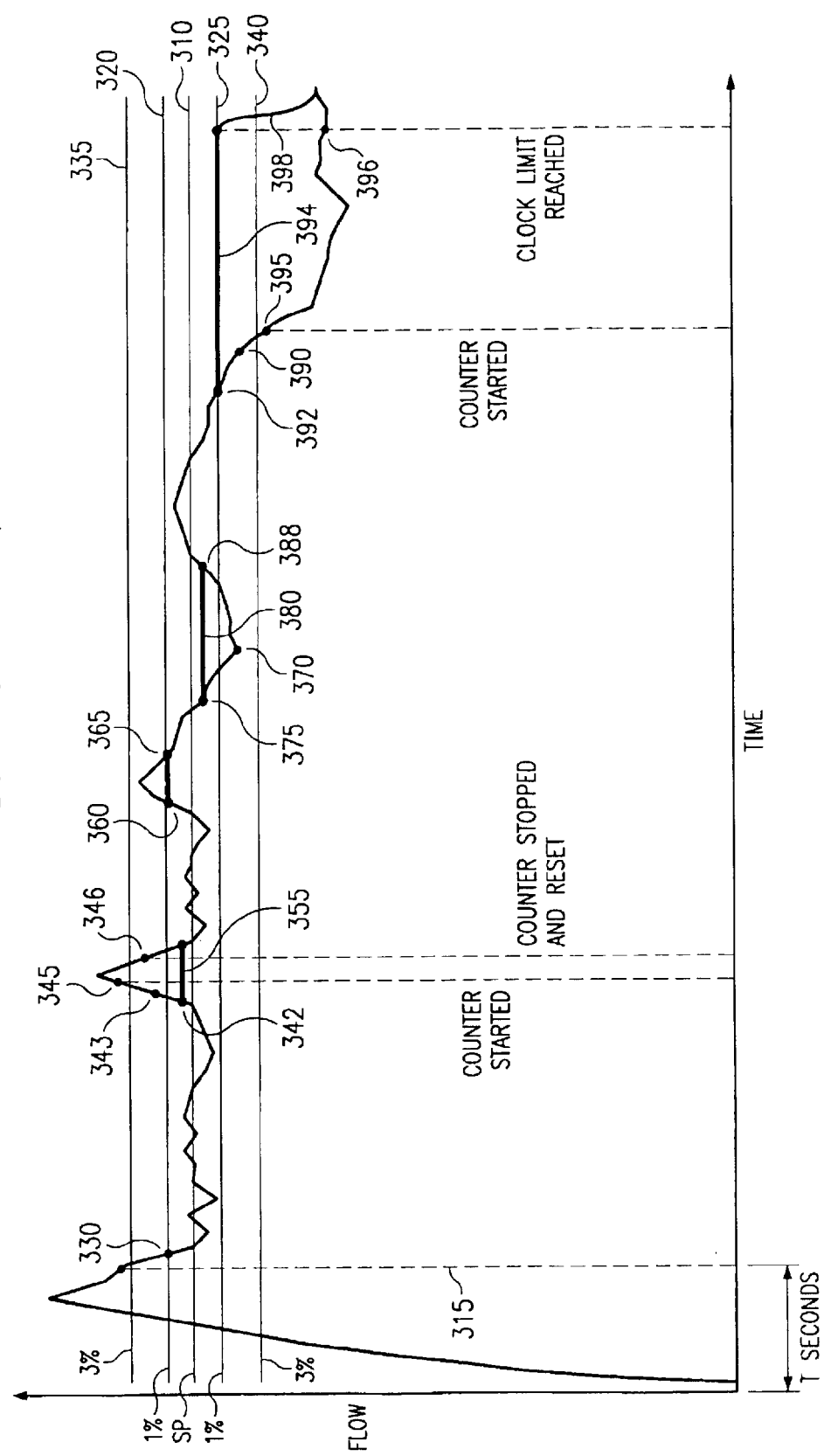
FIG. 3 is a graphical representation of one embodiment of the process of filtering an indicated flow in an embodiment of a output filter according to the present invention.

FIG. 3 is a graphical representation of one embodiment for processing and filtering an indicated flow of a output filter according to the present invention. Flow vs. time graph 300 represents the filtering of indicated flow 225 of one embodiment of an output filter 230 according to the present invention. On graph 300, a user-defined set point ("SP") is represented by line 310. As would be understood by one of ordinary skill in the art, a set point can be defined by the user, for example, when a manufacturing tool is powered up or when the user wishes to redefine the set point to account for new operating conditions. The set point establishes a baseline value against which output filter 230 can compare data points taken from the indicated flow 225. The output filter is configurable to wait a predetermined amount of time (e.g., t seconds, represented by line 315) after a particular event (e.g., a power up or change in set point) to allow the indicated flow 225 to achieve an approximately steady state. It should be understood that t can be an adjustable value and can be user defined. During this delay time "t", the indicated flow 225 can be passed as the filtered indicated flow 235. By not filtering the indicated flow during the delay time, the overall response of the output filter 230 can be increased and a user can gain insight into any overshoots of the set point or other trends that may occur prior to indicated flow 225 reaching an approximately steady state.

In the embodiment shown in FIG. 3, after t seconds (line 315), output filter 230 can begin monitoring indicated flow 225 to determine when the indicated flow 225 is within an allowable deviation from the baseline (e.g., in this embodiment, plus or minus one percent of the SP, represented by lines 320 and 325, respectively). After t seconds (i.e., the delay time expires), and once the indicated flow 225 is determined to be within the allowable deviation (e.g., plus or minus one percent of SP in this case), represented by point 330, the output filter 230 engages to filter noise and/or transient spikes. Filtering of indicated flow 225 can occur in real-time (i.e., as fast as computer and communication technology will allow). In one embodiment of the present invention, output filter 230 may not begin filtering at exactly the time when indicated flow 225 crosses into the plus or minus one percent range. Instead, output filter can sample indicated flow 225 and begin filtering indicated flow 225 when the first sample of indicated flow 225 falls within the plus or minus one percent band (assuming t seconds have expired).

Once output filter 230 is engaged, output filter 230 can sample indicated flow 225 to determine if indicated flow 225 falls outside of an allowable deviation. Again, in the case shown in FIG. 3, the output filter 230 samples indicated flow 225 to determine if indicated flow 225 deviates from the set point by more than plus or minus one percent (i.e., the allowable deviation delineated by lines 320 and 325, respectively). When a sample taken by the output filter 230 indicates that indicated flow 225 is within the plus or minus one percent band (in the example of FIG. 3), output filter 230 can output the sample as the filtered indicated flow 235. In other words, output filter 230 can pass indicated flow 225 as filtered indicated flow 235. In a DSP mass flow controller, this can include passing the most recent sample of the indicated flow to the output port of the DSP. Alternatively, if the sample of the indicated flow 225 falls outside of the allowable deviation, output filter 230 can output a value from within the allowable deviation as filtered indicated flow 225. For example, when output filter 230 determines, at point 343, that indicated flow 225 has crossed outside of the plus or minus one percent band (i.e., is above line 320, in this example) output filter 230 can output the last sample that fell within the allowable deviation (or any other value from within the allowable deviation), indicated by point 342, as the filtered indicated flow 235 (represented by line 355). Thus, when indicated flow 225 falls outside of the allowable deviation from the setpoint, output filter 230 can output, at least for awhile, a filtered indicated flow 235 that falls within the allowable deviation. In one embodiment of the present invention, output filter 230 can output the value of the last sample of indicated flow 225 that fell within the allowable deviation as the filtered indicated flow.

In one embodiment of the present invention, the output filter is capable of outputting a value within the allowable deviation (e.g., plus or minus 1%) so long as indicated flow 225 does not exceed a buffer. However, when a sample (e.g., taken at point 345) indicates that indicated flow 225 exceeds the buffer, in this case plus or minus three percent (represented by lines 335 and 340, respectively), output filter 230 can engage a timer (not shown). The timer runs until the timer has reached its clock limit (e.g., a predefined run time) or indicated flow 225 returns to within the buffer (e.g., plus or minus 3% or some other predetermined range) whichever comes first.

Once the timer is started at least three events can affect the values that output filter 230 passes as the filtered indicated flow: indicated flow 225 can return to within the allowable deviation before the timer runs out, the timer can run out before indicated flow 225 returns to within either the buffer or the allowable deviation, or indicated flow 225 can return to within the buffer, but not the allowable deviation, before the timer reaches its clock limit. Further discussing each of these cases, if indicated flow 225 returns to within the allowable deviation before the timer reaches the clock limit, output filter 230 can resume outputting indicated flow 225 as the filtered indicated flow 235. If, however, indicated flow 225 returns to within the buffer, but not the allowable deviation, before the clock limit is reached, as shown by point 346, output filter 230 can reset the timer and can continue to pass a good value (e.g., a value within the allowable deviation) as the filtered indicated flow 235. Otherwise, if the timer runs out before indicated flow 225 returns to within either the buffer or the allowable deviation, output filter 230 can output the indicated flow 225 as the filtered indicated flow 235. In this last case, however, the filtered indicated flow will exceed the buffer.

By calibrating the timer to have a sufficiently long clock limit, transient spikes and noise are effectively filtered out of the filtered indicated flow 235, and, by defining a sufficiently short clock limit, persistent changes in indicated flow can be included in the filtered indicated flow. In one embodiment of the present invention, for example, the clock limit can be on the order of 100 milliseconds Thus, the user can define a run time which filters out noise and transient spikes which occur at higher frequencies, but does not filter out important changes in indicated flow 225, which typically occur at lower frequencies.

As further examples, FIG. 3 illustrates that output filter 230 samples the indicated flow 225 just before it passes outside of the plus or minus one percent band. Therefore, the output filter outputs the value of the last good sample (e.g., point 360) as the filtered indicated flow 235. Coincidentally, in this example, the output filter 230 samples the indicated flow 225 just as the indicated flow 225 crosses back into the plus or minus one percent band (at point 365), and thus returns to outputting indicated flow 225 as the filtered indicated flow. It should be noted that in the spike between point 360 and point 365, the indicated flow 225 did not cross outside of the buffer and therefore, the timer did not start running to measure the transience of the spike.

At point 370, the output filter 230 again takes a sample of indicated flow 225 which falls outside of the plus or minus one percent band (e.g., lines 320 and 325) and therefore output filter 230 begins communicating the value of the last good sample (e.g., taken at point 375) as the filtered indicated flow (represented by line 380). When the sample at point 385 indicates that the indicated flow 225 has returned to being within the plus or minus one percent band, the output filter 230 resumes outputting the indicated flow 225 as the filtered indicated flow (e.g., lines 320 and 325). Again, the filtered indicated flow 225 did not cross outside of the plus or minus three percent buffer (e.g., lines 335 and 340) between point 375 and 385, and thus output filter 230 did not begin the timer.

At point 390 a sample of indicated flow 225 falls outside of the allowable deviation (e.g. lines 320 and 325) and again the output filter 230 outputs in the last good sample (taken at point 392) as the filtered indicated flow 235 (represented by line 394). At point 395, the output filter 230 takes a sample indicating that the indicated flow 225 has crossed outside of the plus or minus three percent buffer. Therefore, output filter 230 starts the timer while continuing to output the last good sample (taken at point 392) as the filtered indicated flow 235. When the timer has run for predetermined amount of time (point 396) without a sample of the indicated flow 305 returning to within the plus or minus three percent buffer, output filter 230 can resume outputting the indicated flow 225 as the filtered indicated flow (represented at line 398). As can be noted from FIG. 3, the indicated flow 225 now remains outside the buffer. Because the indicated flow 225 remains outside the plus or minus three percent buffer (e.g. lines 335 and 340) for a significant amount of time (e.g., longer than the clock limit) between points 395 and 396, the output filter 230 can determine that the indicated flow 225 is not representing noise or transient spikes in the actual flow, but is, instead, indicating a material change in the actual flow. Further, because the filtered indicated flow 235 will exhibit, after point 396, a deviation from the set point that falls outside of the second predefined range an alarm signal can be generated or other response be implemented.

In another embodiment of the present invention, rather than abruptly switching from outputting the filtered indicated flow, represented by line 390 flow, to outputting the indicated flow 225 as the filtered indicated flow, output filter 230 can gradually bring the filtered indicated flow to match the indicated flow 225.

It should be understood that while FIG. 3 describes a specific embodiment of the present invention having a plus or minus one percent allowable deviation and a plus or minus three percent buffer, FIG. 3 is not limiting and other embodiments of the present invention are available. For example, both the allowable deviation from baseline and the buffer can be user definable and can comprise percent deviations from the baseline, absolute deviations or other statistical deviations known in the art. Additionally, in one embodiment of the present invention, only an allowable deviation, but not a buffer, can be defined. Thus, for example, an embodiment of the output filter of the present invention can be configured to start the timer when a sample of the indicated flow falls outside of the plus or minus one percent (or otherwise defined) allowable deviation. However, the buffer can be provided so that very small offsets (e.g., offsets just outside of the plus or minus one percent range) do not start the clock and are not represented in the filtered indicated flow. Furthermore, it should be understood that the allowable deviation and the buffer can be asymmetrical about the baseline. As just one example, allowable deviation could be plus one percent and minus two percent, etc.

In the foregoing examples, output filter 230 compared the indicated flow to a baseline defined by a set point. However, in other embodiments of the present invention, a user can arbitrarily define the baseline. Additionally, a user can define the delay time "t" and the timer's clock limit. It should be noted that graph 300 is not to scale and t seconds can be on the order of multiple seconds while the timer clock limit (e.g., the time difference between point 395 and point 396) can be on the order of milliseconds.

Figure 4:
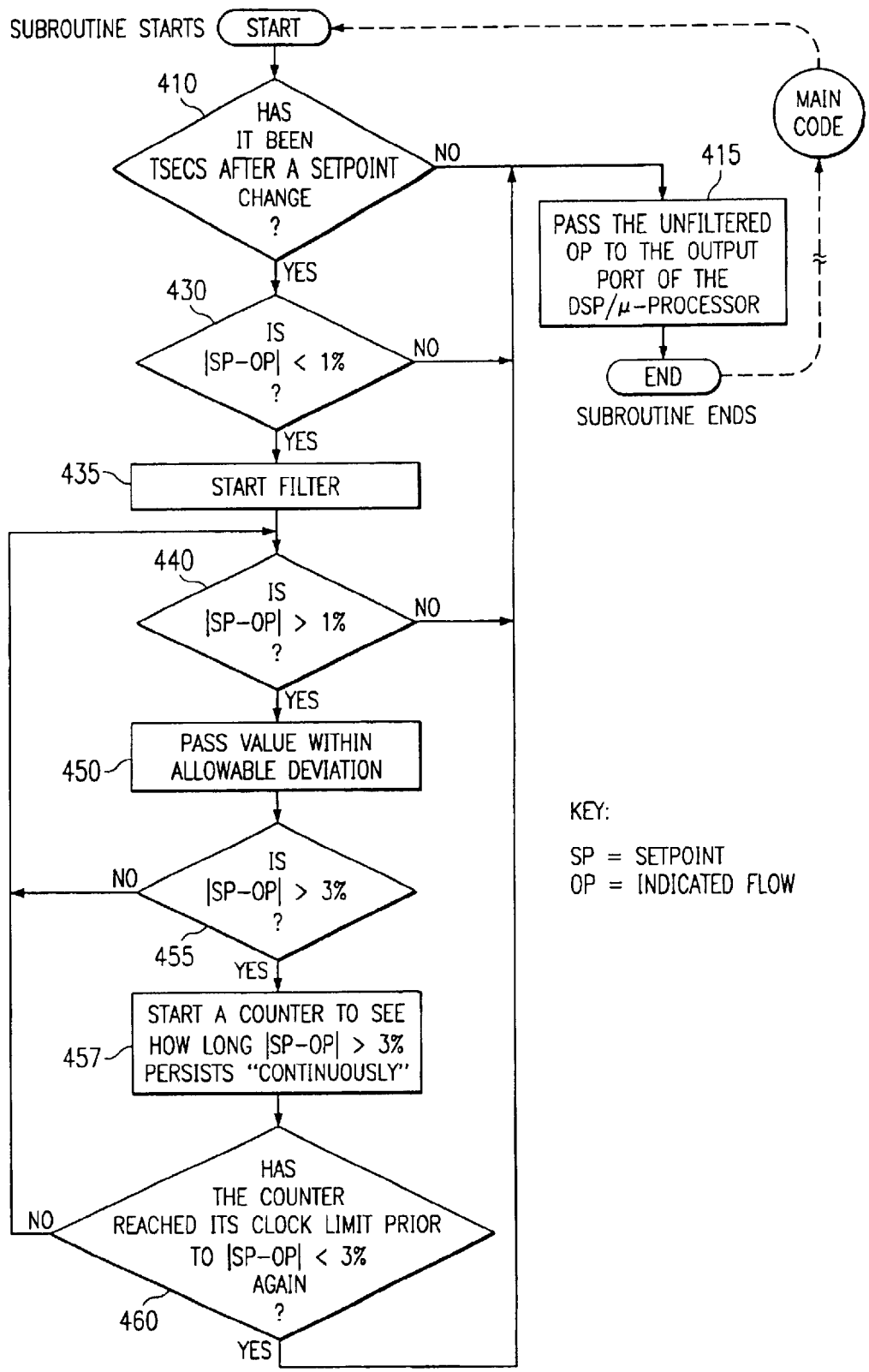
FIG. 4 illustrates a flow chart for the same embodiment of the output filter according to the present invention that is implemented with a mass flow controller.

FIG. 4 illustrates a flow chart for one embodiment of the output filter according to the present invention that is implemented with a mass flow controller. At step 410, the output filter determines if the predetermined time delay (e.g., t seconds in FIG. 3) has passed. If the time delay has not passed, the output filter can pass indicated flow 225 as filtered indicated flow 235 (e.g. step 415), otherwise control passes to step 430, wherein the output filter can determine if indicated flow 225 has come within an allowable deviation of a baseline. In the example of FIG. 4, output filter 230, at step 430, will determine if the indicated flow is within plus or minus one percent of a set point. If at step 430, the indicated flow signal is within the allowable deviation, the output filter will begin filtering the indicated flow 225 at step 435. Otherwise, the indicated flow will be passed as the filtered indicated flow until the indicated flow comes within the allowable deviation (step 415). By allowing for a delay of t seconds and determining if the indicated flow is within the allowable deviation of the baseline before filtering, the indicated flow 225 can achieve an approximately steady state before filtering begins.

If t seconds have passed (step 410) and indicated flow 225 has come within the allowable deviation (step 435), output filter 230, at step 440, can determine whether or not the indicated flow has exceeded the allowable deviation from a baseline. If not, the output filter continues to pass the indicated flow as the filtered indicated flow (step 415). If, on the other hand, the indicated flow is outside of the allowable deviation, output filter 230 can pass a good value of the indicated flow as the filtered indicated flow (step 450), and control passes to step 455. In one embodiment of the present, output filter 230, at step 450, can pass the last good sample of the indicated flow as the filtered indicated flow. In other embodiments of the present invention, output filter 230 can pass any value within the allowable deviation as the filtered indicated flow if it is determined that the indicated flow exceeds the allowable deviation.

If, at step 440, the indicated flow has exceeded the allowable deviation, output filter 230, at step 455, can determine if the indicated flow also exceeds a buffer. In the example of FIG. 4, output filter 230, at step 455 will determine if the value of indicated flow exceeds the baseline by more than three percent. If the indicated flow does not exceed the buffer, output filter 230 can return to step 440 and determine if the indicated flow (or the next sample of the indicated flow) exceeds the allowable deviation (e.g., plus or minus one percent of the set point). If at step 455, output filter 230 determines, conversely, that the indicated flow exceeds the buffer, output filter 230 can engage a timer (step 457). Output filter 230 can then determine if the timer reaches its clock limit (i.e., a predetermined run time) before the indicated flow returns to within the buffer (step 460). If the indicated flow returns to within the buffer before the timer reaches its clock limit, output filter 230 can return to step 440. Otherwise, the output filter can pass the indicated flow, which has remained outside of the buffer for at least the run time of the clock (indicating a continuous or persistent change in actual flow), as the filtered indicated flow. Again, output filter 230, in one embodiment of the present invention, can bring the filtered indicated flow to gradually meet the value for the indicated flow, thereby avoiding passing sharp transitions in values in the filtered indicated flow. The process described in conjunction with FIG. 4 can, in one embodiment of the present invention, be implemented as a looped subroutine to an existing program (e.g., a main program) already utilized by the mass flow controller, though the process can be implemented in any other manner known to those in the art (as a stand alone program, for example).

In summary, an embodiment of the present invention is capable of outputting the indicated flow as the filtered indicated flow when the indicated flow is within a predefined range about the set point (e.g., when the indicated flow is within an allowable deviation of a baseline). However, if the indicated flow crosses outside of that predefined range, the last value of the indicated flow that was within the predefined range can be output as the filtered indicated flow. Furthermore, if the indicated flow deviates from the set point by a large enough amount (e.g., is outside of the buffer), for a long enough time (e.g., greater than the clock limit), the indicated flow can be output as the filtered indicated flow. Hence, high frequency noise or short duration spikes in the indicated flow can be represented by the last good value of the indicated flow, while persistent deviations from the set point in the indicated flow will also be represented in the filtered indicated flow. As noise and transient spikes are removed from the indicated flow while persistent deviations in the indicated flow are represented in the filtered indicated flow, the filtered indicated flow provides a better understanding of changes in the actual flow that are likely to materially affect the system without effecting the response time of the mass flow meter. Because noise and transient spikes can be removed from the indicated flow while persistent deviations can be represented, embodiments of the output filter according to the present invention can output a filtered indicated flow which is less likely to cause false alarms. Furthermore, because manufacturing tools are less likely to shut down due to false alarms, the present invention can decrease downtime and prevent the loss wafer batches, leading to significant cost savings.

In an alternative embodiment, the output filter of the present invention does not have to actually produce a filtered indicated flow. In this embodiment, the present invention would not pass any signal until the output filter determines that the timer has reached its clock limit prior to the indicated flow returning to within the buffer. If the output filter determines that the indicated flow has not returned to being within the buffer prior to the timer reaching its clock limit, the output filter could then begin passing the original indicated flow as the filtered indicated flow. In other words, the filtered indicated flow can be the same as the indicated flow.

Figure 5:
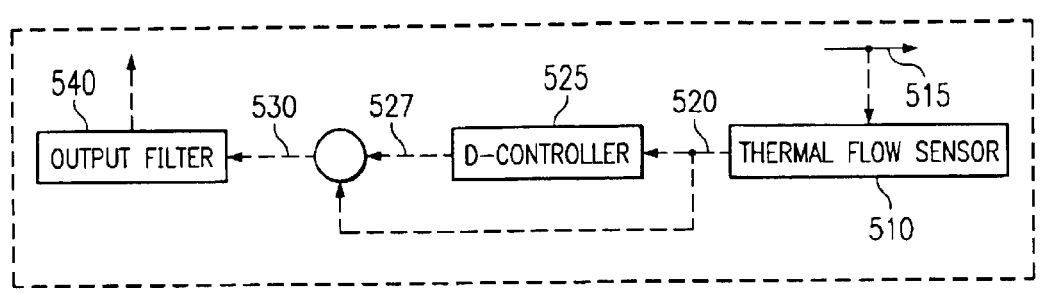
FIG. 5 is a diagrammatic representation of a mass flow meter implementing one embodiment of a output filter according to the present invention.

In addition to being used with mass flow controllers, embodiments of output filters according to the present invention can be implemented with mass flow meters. FIG. 5 is a schematic representation of a mass flow meter 500 implementing one embodiment of a output filter according to the present invention. At mass flow meter 500, a thermal flow sensor 510 is capable of measuring the actual flow 515 of a fluid through a system and outputting and electrical signal 520 to represent actual flow 515. D-controller 525 can determine the weighted amount of the first derivative of signal 520 by multiplying a gain times the first derivative of signal 520. D-controller 525 can output the weighted amount of the first derivative of signal 520 as derivative signal 527, which can then be added to signal 520 to establish an indicated flow 530. Again, D-controller 525, which can determine the weighted amount of the first derivative of signal 520 in order to increase the response time of the system, can enhance noise found in signal 520. As will be described in greater detail below, output filter 540 can then (i) filter the indicated flow 530 through running average, FIR, IIR or other filtering scheme as would be understood by those of ordinary skill in the art to derive an intermediate filtered indicated flow, (ii) derive a derivative of the intermediate filtered indicated flow, (iii) multiply the derivative by a gain, which can be the same as or different than the gain applied by D-controller 525, and (iv) add the intermediate filtered indicated flow to the derivative of the intermediate filtered indicated flow multiplied by the gain to derive a filtered indicated flow 620. In one embodiment of the present invention, output filter 540 can be implemented using a DSP platform.

Figure 6:
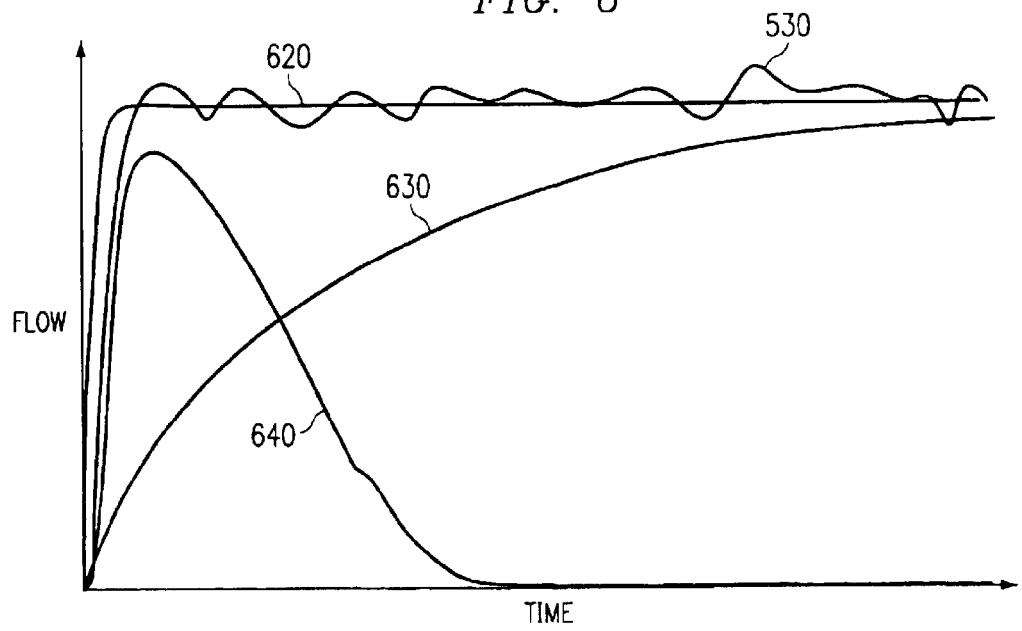
FIG. 6 provides a flow versus time graph for one embodiment of a filtering process occurring at the same embodiment of a output filter for a mass flow meter.

FIG. 6 provides a flow versus time graph for one embodiment of a filtering process of embodiment of a output filter for a mass flow meter of the present invention. Again, in one embodiment of the present invention, this process can be carried out in real-time. The output filter can receive an indicated flow, represented by line 530. As previously stated, the indicated flow 530 can contain enhanced noise produced by D-controller 525. In order to compensate for the enhancement of noise and any transient spikes that may appear in indicated flow 530, the output filter can filter the indicated flow 530 to produce a filtered indicated flow 620. To derive filtered indicated flow 620, one embodiment of the output filter 540 can first apply standard filtering techniques, such as running average, IIR, FIR or other techniques that would be understood by those of ordinary skill in the art, to indicated flow 530 to produce an intermediate filtered indicated flow 630. The output filter can then determine a derivative (e.g., a first derivative) of the intermediate filtered indicated flow 530 and multiply the derivative by a gain ("K"), the results of which are represented by weighted derivative line 640. Output filter 540 can then add the intermediate filtered indicated flow 630 and the weighted derivative of the intermediate filtered indicated flow 640 to produce the filtered indicated flow signal 620. If implemented using a DSP (or other micro-processor), output filter 230 can pass filtered indicated flow 620 to the output port of the DSP (or other micro-processor).

As can be noted from the example in FIG. 6, output filter 540 removes the noise and transient spikes indicated flow 530. Because noise can be removed from, or, at least, substantially reducing the indicated flow, embodiments of the present invention can create a filtered indicated flow which is less likely to cause false alarm conditions in manufacturing tools, thereby reducing downtime and wafer batch loss. Furthermore, this can be done without reducing the response time of the mass flow meter.

Embodiments of the present invention provide output filters that can remove noise and transient spikes from an indicated flow, while continuing to show persistent pressure changes in the indicated flow. The filtered indicated flow can be compared to a set point, and if the filtered indicated flow deviates from the set point by a large enough extent, an alarm can be generated, shutting down associated manufacturing tools. Because the filtered indicated flow contains less noise and fewer transient pressure spikes, it is much less likely to cause false alarms, thereby reducing manufacturing tool downtime and saving considerable expense. Additionally, the embodiments of the present invention do not reduce the response time of mass flow controllers and mass flow meters.

Although the present invention has been described in detail herein with reference to the illustrative embodiments, it should be understood that the description is by way of example only and is not to be construed in a limiting sense. It is to be further understood, therefore, that numerous changes in the details of the embodiments of this invention and additional embodiments of this invention will be apparent to, and may be made by, persons of ordinary skill in the art having reference to this description and practice of the invention disclosed herein. It is contemplated that all such changes and additional embodiments are within the intent and true scope of this invention as claimed below.

What is claimed is:

1. A method for filtering an indicated flow in a mass flow device wherein said indicated flow is a function of actual gas flow, the method comprising:

determining if said indicated flow is within an allowable deviation of a baseline;

if said indicated flow is within said allowable deviation of said baseline, outputting said indicated flow as a filtered indicated flow; and if said indicated flow is not within said allowable deviation of said baseline, outputting a value within said allowable deviation of said baseline as said filtered indicated flow.

2. The method for filtering an indicated flow according to claim 1 further comprising the steps of:

if the said flow is not within said allowable deviation of said baseline;

starting a timer having a clock limit;

determining if said indicated flow has returned to within said allowable deviation before said timer reaches said clock limit;

if said indicated flow has returned to within said allowable deviation before said timer reaches said clock limit, outputting said indicated flow as said filtered indicated flow; and otherwise, outputting said value within said allowable deviation until said timer reaches said clock limit and outputting said indicated flow as said filtered indicated flow after said timer reaches said clock limit.

3. The method for filtering an indicated flow according to claim 2, further comprising:

outputting said indicated flow as said filtered indicated flow for a delay period; and continuing to output said indicated flow as said filtered indicated flow without filtering until said filtered indicated flow reaches an approximately steady state.

4. The method for filtering an indicated flow according to claim 1, further comprising:

determining if said indicated flow has exceeded a buffer;

if said indicated flow has exceeded said buffer, engaging a timer having a clock limit;

determining if said indicated flow has returned to being within said buffer prior to said timer reaching said clock limit;

if said indicated flow has returned to within said buffer prior to said timer reaching said clock limit:
  returning said indicated flow as said filtered indicated flow if said indicated flow is within said allowable deviation; and
  returning said value within said allowable deviation as said indicated flow and resetting said timer if said indicated flow is not within said allowable deviation but is within said buffer; and
if said indicated flow has not returned to within said buffer prior to said timer reaching said clock limit, outputting said indicated flow as said filtered indicated flow.

5. The method for filtering an indicated flow according to claim 4, further comprising:
  outputting said indicated flow as said filtered indicated flow for a delay period; and
  continuing to output said indicated flow as said filtered indicated flow until said indicated flow reaches an approximately steady state without filtering.

6. The method for filtering an indicated flow according to claim 1, further comprising:
  outputting said indicated flow as said filtered indicated flow for a delay period; and
  continuing to output said Indicated flow as said filtered indicated flow until said filtered indicated flow reaches an approximately steady state without filtering.

7. The method for filtering an indicated flow according to claim 1, wherein said allowable deviation is at least plus or minus one percentage of a set point.

8. A method for filtering an indicated flow in a mass flow controller comprising:
  (A) outputting said Indicated flow as said filtered indicated flow for a delay period;
  (B) when it is determined that said indicated flow reaches an approximately steady state, outputting said indicated flow as said filtered indicated flow;
  (C) determining if said indicated flow has remained within an allowable deviation from a baseline;
  (D) if said indicated flow has remained within said allowable deviation, continuing to output said indicated flow as said filtered indicated flow; and
  (E) if said indicated flow has not remained within said allowable deviation:
    (1) outputting a value from within said allowable deviation as said filtered indicated flow;
    (2) determining if said indicated flow has exceeded a buffer;
    (3) if said indicated flow has exceeded said buffer:
      a) engaging a timer having a clock limit;
      b) determining if said indicated flow has returned to within said buffer prior to said timer reaching said clock limit; and
      c) if said indicated flow has not returned to being within said buffer prior to said timer reaching said clock limit, outputting said indicated flow as said filtered indicated flow; and
      d) if said indicated flow has returned to being within said buffer prior to said timer reaching said clock limit:
        i) outputting said indicated flow as said filtered indicated flow if said indicated flow is within said allowable deviation; and
        ii) continuing to output said value from within said allowable deviation as said filtered indicated flow if said indicated flow is not within said allowable deviation but is within said buffer.

9. The method for filtering an indicated flow according to claim 8, wherein said baseline comprises a set point.

10. The method for filtering an indicated flow according to claim 8, wherein said value from within said allowable deviation comprises a previous sampled value of said indicated flow that was within said allowable deviation.

11. The method for filtering an indicated flow according to claim 8 wherein said allowable deviation is at least plus or minus one percent of a set point.

12. A mass flow controller operable to:
  determine if an indicated flow is within an allowable deviation of a baseline;
  if said indicated flow is within said allowable deviation, output said indicated flow as a filtered indicated flow; and
  if said indicated flow is not within said allowable deviation, output a value that is within said allowable deviation as said filtered indicated flow.

13. The mass flow controller of claim 12, wherein said mass flow controller is further operable to:
  if said indicated flow is not within said allowable deviation:
    engage a timer having a clock limit; and
    determine if said indicated flow has returned to being within said allowable deviation prior to said timer reaching said clock limit.

14. The mass flow controller of claim 13, wherein said mass flow controller is further operable to:
  output said indicated flow as said filtered indicated flow for a delay period; and
  continue to output said indicated flow as said filtered indicated flow until said filtered indicated flow comes within said allowable deviation without filtering.

15. The system for filtering an indicated flow of claim 12, wherein said mass flow controller is further operable to:
  determine if said indicated flow has exceeded a buffer;
  if said indicated flow has exceeded a buffer, start a timer having a clock limit;
  determine if said indicated flow has returned to being within said buffer prior to said timer reaching said clock limit;
  if said indicated flow has returned to being within said buffer prior to said timer reaching said predetermined time limit:
    return said indicated flow as said filtered indicated flow if said indicated flow is within said allowable deviation; and
    return said value that is within said allowable deviation as said indicated flow if said indicated flow is not within said allowable deviation; and
  otherwise, output said indicated flow as said filtered indicated flow.

16. The system for filtering an indicated flow of claim 15, wherein said mass flow controller is further operable to:
  output said indicated flaw as said filtered indicated flow for a delay period; and
  continue to output said indicated flow as said filtered indicated flow until said filtered indicated flow comes within said allowable deviation without filtering.

17. The system for filtering an indicated flow of claim 16, wherein said mass flow controller is further operable to:
  output said indicated flow as said filtered indicated flow for a delay period; and
  continuing to output said indicated flow as said filtered indicated flow until said filtered indicated flow comes within said allowable deviation.

* * * * *